United States Patent [19]

Kazlauskas

[11] Patent Number: 4,538,046
[45] Date of Patent: Aug. 27, 1985

[54] PRECISE POSITIONING FOR A WELDING ELECTRODE WHICH FOLLOWS A THREE DIMENSIONAL WELD PATH

[76] Inventor: Gasparas Kazlauskas, 10219 Briarwood Dr., Los Angeles, Calif. 90024

[21] Appl. No.: 370,687

[22] Filed: Apr. 22, 1982

Related U.S. Application Data

[63] Continuation-in-part of Ser. No. 207,128, Nov. 17, 1980, abandoned.

[51] Int. Cl.³ ............................................... B23K 9/12
[52] U.S. Cl. ............................ 219/125.1; 219/124.03; 219/124.1
[58] Field of Search ........... 219/125.1, 125.11, 124.34, 219/124.22, 124.03, 124.1

[56] References Cited

U.S. PATENT DOCUMENTS

| | | | |
|---|---|---|---|
| 3,119,009 | 1/1964 | Zeller | 219/125.1 |
| 3,815,807 | 6/1974 | Bartley | 219/125.11 |
| 3,924,094 | 12/1975 | Hansen et al. | 219/124.34 |
| 4,215,299 | 7/1980 | Edwin et al. | 219/124.34 |
| 4,255,643 | 3/1981 | Balfanz | 219/125.1 |
| 4,418,266 | 11/1983 | Rosenbeck et al. | 219/125.1 |

FOREIGN PATENT DOCUMENTS

| | | | |
|---|---|---|---|
| 2236786 | 2/1973 | Fed. Rep. of Germany | 219/125.11 |
| 1437481 | 5/1976 | United Kingdom | 219/125.1 |

*Primary Examiner*—Clifford C. Shaw
*Attorney, Agent, or Firm*—Jack C. Munro

[57] ABSTRACT

A welding apparatus which includes a welding electrode and a filler wire assembly. The welding electrode and the filler wire assembly are fixed together and are to move along a weld path on a workpiece. The weld path may either take a regular or an irregular shape. The welding electrode is mounted on a welding electrode bracket which is rotatably mounted on a rotational axis upon a housing. The rotational axis of the filler wire assembly in respect to the welding electrode is precisely controlled so that just the tip of the filler wire is continuously located just forward (along the weld path) of the tip of the welding electrode regardless of the direction of movement of the welding electrode along the weld path. Three dimensional, preprogrammed movement along an X-axis, a Y-axis and a Z-axis can occur between the welding electrode and the workpiece. The welding electrode is also permitted an additional amount of limited movement along the Z-axis which is not programmed. This limited movement is to maintain the electrode at a constant distance from the workpiece within the weld path. This is obtained through an automatic voltage control system which is to hold the arc voltage constant.

4 Claims, 12 Drawing Figures

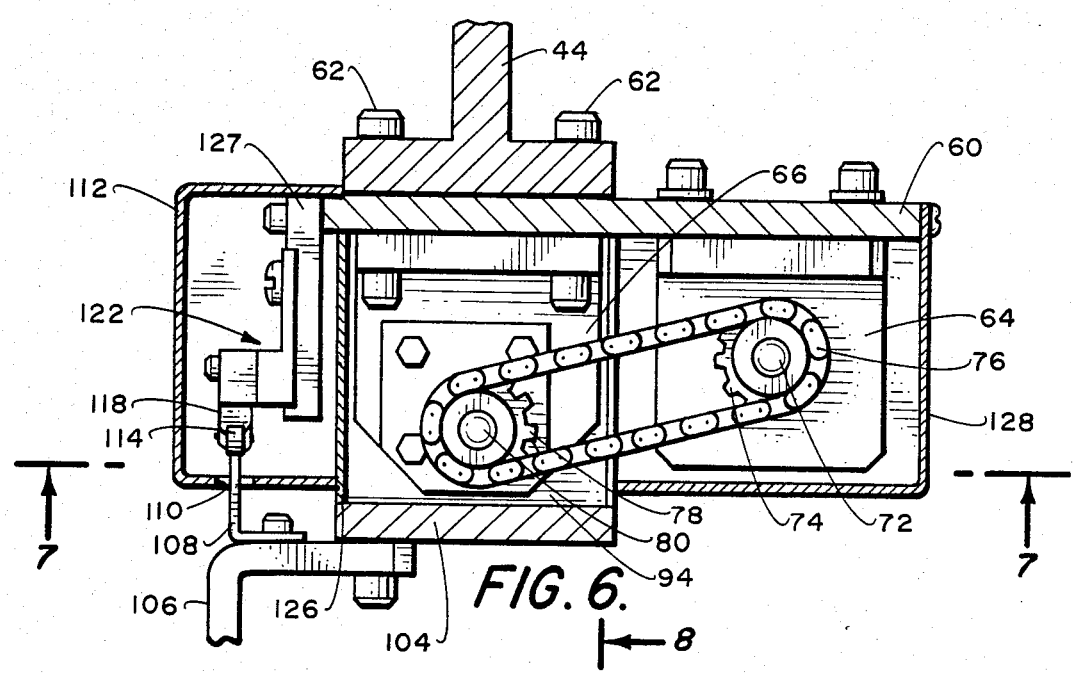
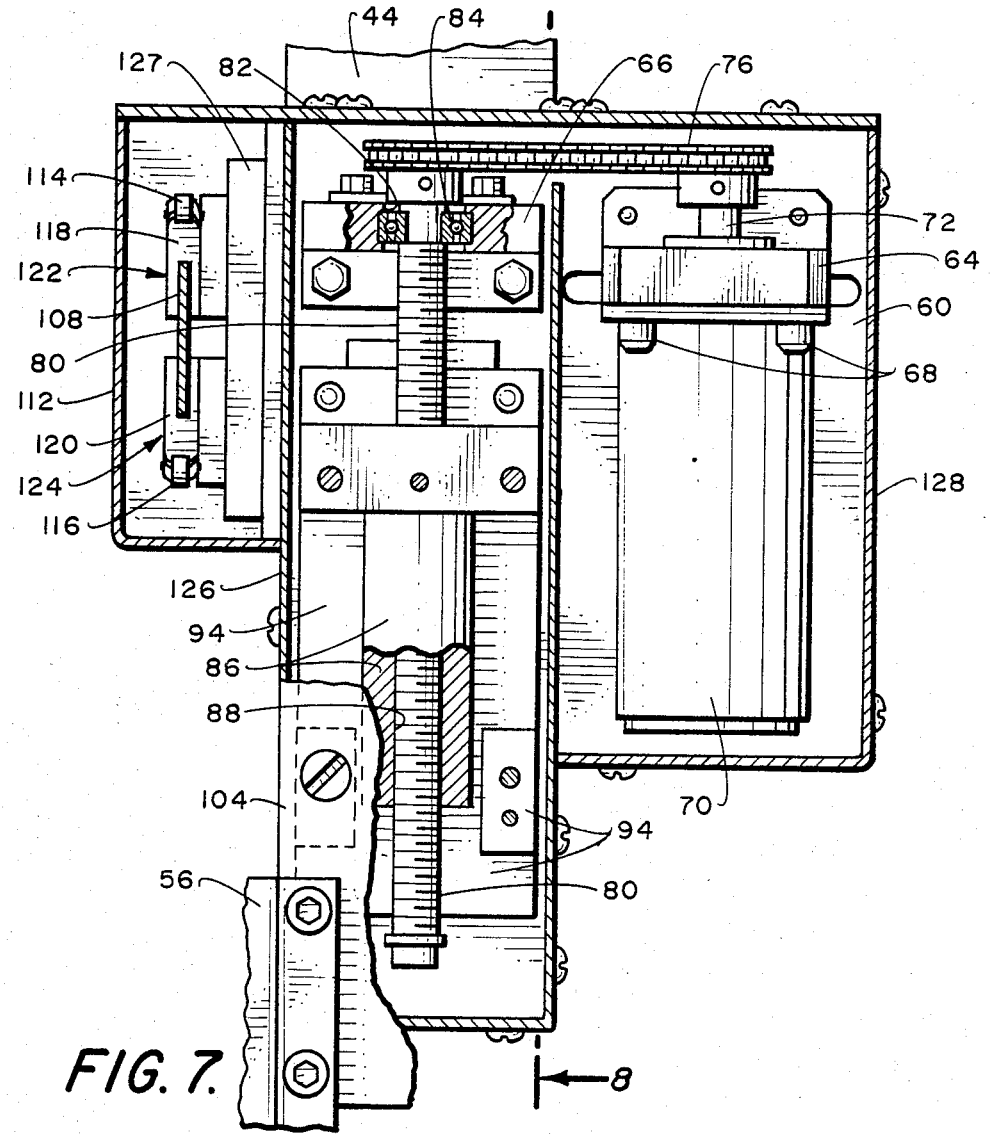

PRECISE POSITIONING FOR A WELDING ELECTRODE WHICH FOLLOWS A THREE DIMENSIONAL WELD PATH

REFERENCE TO PRIOR APPLICATION

This application is a continuation-in-part of U.S. patent application Ser. No. 207,128, filed Nov. 17, 1980, entitled WELDING APPARATUS, by the same inventor now abandoned.

BACKGROUND OF THE INVENTION

The field of this invention relates to automatic welding equipment and more particularly to a welding apparatus which locates the filler wire assembly in a precise position in respect to the welding electrode regardless of the direction of movement of the welding electrode along the weld path and accurately maintains constant the physical spacing of the electrode from the weld path.

It is well known to employ the use of welding electrode assemblies within apparatuses for automatic welding structures. The welding electrode is to move along the weld path during the welding of the structure. The filler wire, which is melted by the electrode and ultimately forms the weld bead, is to be located just forward of the welding electrode. The welding electrode is to be movable in a given direction, either lineally or arcuate. Just forward is to be defined as along the direction of movement and just ahead of the tip of the welding electrode.

Generally, automatic welding apparatuses are employed to weld regular shaped structures, such as cylinders, spheres and the like. In the welding of such regular shaped structures, the welding electrode begins movement at a particular point and moves along the weld path to return to this particular point without ever changing directions of movement. In such an instance, it is only required that the filler wire assembly be initially positioned with respect to the welding electrode and it will remain in that position along the entire weld path.

However, a problem arises if the weld path is not regular. For instance, in the event that the weld path is polygonal shaped, or the weld path does lie within a single plane and the welding electrode must move within three dimensions in order to move along the weld path. This means that the welding electrode will move to the right or to the left. However, the filler wire assembly must be turned in respect to the workpiece in order to locate the filler wire assembly in its required position. Examples of such irregularly shaped weld paths may be on odd shaped parts, such as engine cowlings for aircraft.

Automatic welding apparatuses are not designed to weld only an individual part. Usually there are a plurality of parts which are to be welded in the same location. Each of the structures are to be an exact replica of each other. However, there are inherently produced small discrepancies between one part and another part. These small discrepancies will affect the preprogrammed weld path resulting in the welding electrode being spaced either too close or too far away from the weld path. A minute change in this spacing can seriously affect the quality of the weld. Previously, it is believed that there has not been an automatic welding apparatus which precisely controlled the position of a welding electrode along a preprogrammed weld path.

SUMMARY OF THE INVENTION

The structure of this invention relates to the usage of a welding head which includes a welding electrode and a filler wire assembly which is to be usable for the producing of a weld by means of a computer along a given welding path within a workpiece. Either the welding head is to be moved relative to the workpiece or the workpiece moved relative to the welding head. The welding path can take any irregular shape. The movement of the welding head and workpiece is to be precisely accomplished through the use of a program within a computer. The precise welding path is programmed into the computer and the welding head is to be rotated simultaneously along with relative lineal movement between the workpiece and welding head along the x-axis, the y-axis and the z-axis. The rotation of the welding head is so as to constantly maintain the filler wire assembly located just forward of the tip of the welding electrode along the weld path. The axis of rotation of the welding electrode in respect to the housing is identical to the longitudinal center axis of the welding electrode. The welding head includes a feedback assembly, which is to continuously verify the position of the filler wire assembly and, if the filler wire assembly is not precisely positioned at its exact location, the feedback assembly will cause the filler wire assembly to assume its required position. To compensate for any small imperfections in the programmed weld path or in the welding head equipment, the welding electrode is permitted to move relative to its mounting bracket a limited distance toward or away from the workpiece. This movement is controlled by a separate motor which in turn is controlled by arc voltage. Optimum weld quality is obtained with a constant arc voltage setting. Arc voltage varies according to physical spacing of the tip of the electrode from the workpiece. A minute change in spacing causes a significant voltage change. This maintaining of the voltage constant is termed automatic voltage control (AVC).

BRIEF DESCRIPTION OF THE DRAWINGS

FIG. 6 is a cross-sectional view taken along line 6—6 of FIG. 5 showing in more detail the motor arrangement operating a further adjustment position of the tip of the welding electrode with respect to the workpiece which is to be controlled by maintaining of the welding voltage constant;

FIG. 7 is a cross-sectional view taken along line 7—7 of FIG. 6;

DETAILED DESCRIPTION OF THE SHOWN EMBODIMENT

Figures 1, 2:
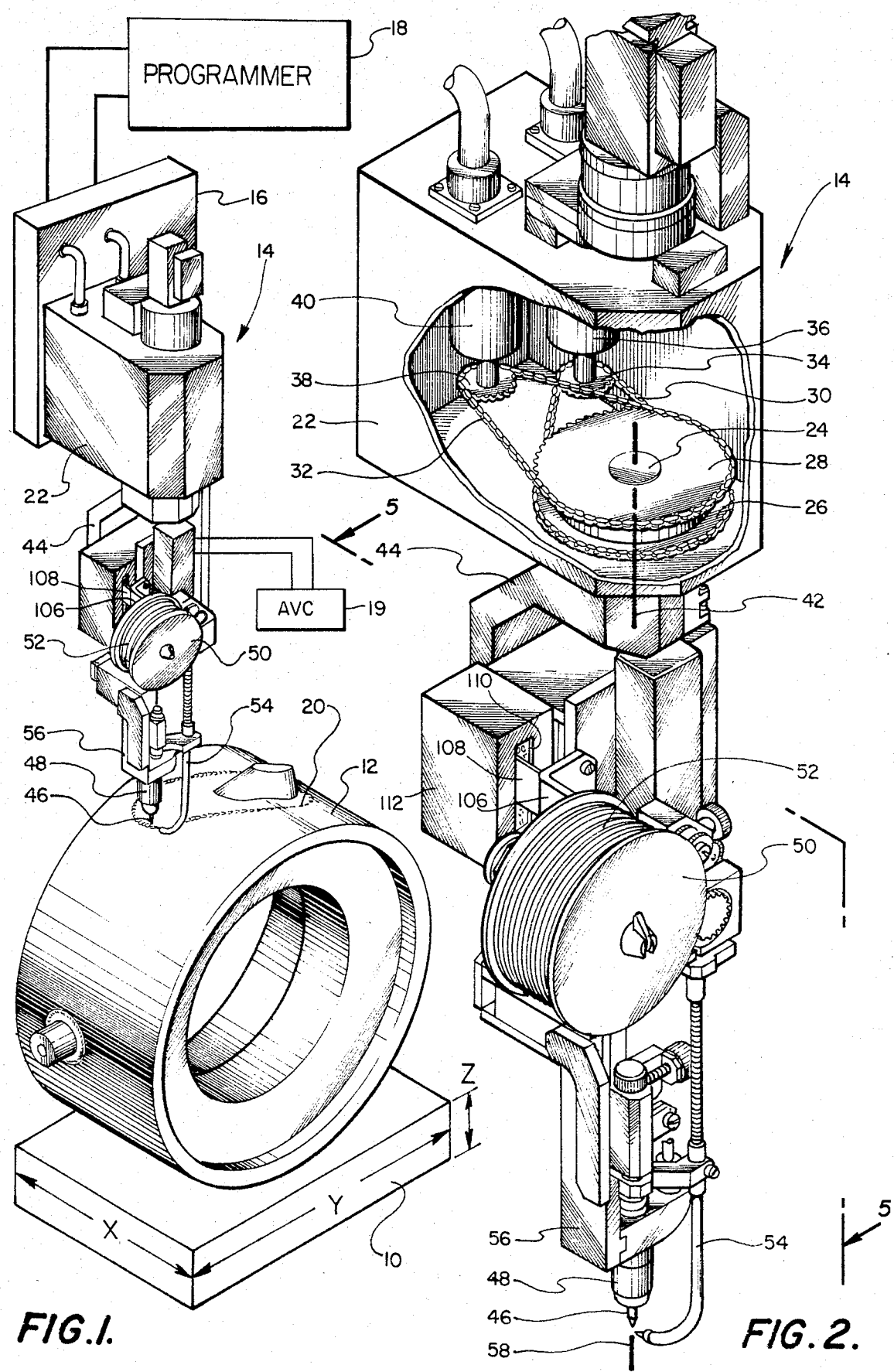
FIG. 1 is an overall perspective view of the welding apparatus of this invention showing an illustrative weld path within an irregularly shaped workpiece.
FIG. 2 is a partly cut-away, perspective view of the welding head apparatus of this invention showing the mechanism for rotating the welding electrode and mounting bracket.
Figure 3:
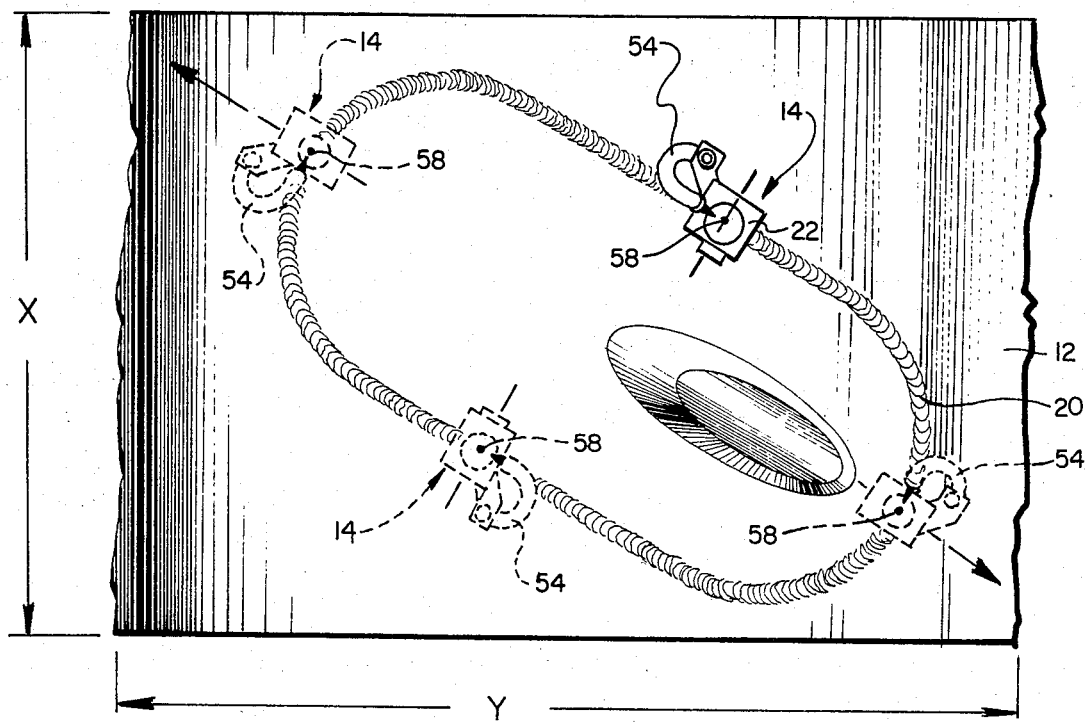
FIG. 3 is a diagramatic view showing the position of the welding electrode at various locations with respect to a weld path on a workpiece.
Figure 4:
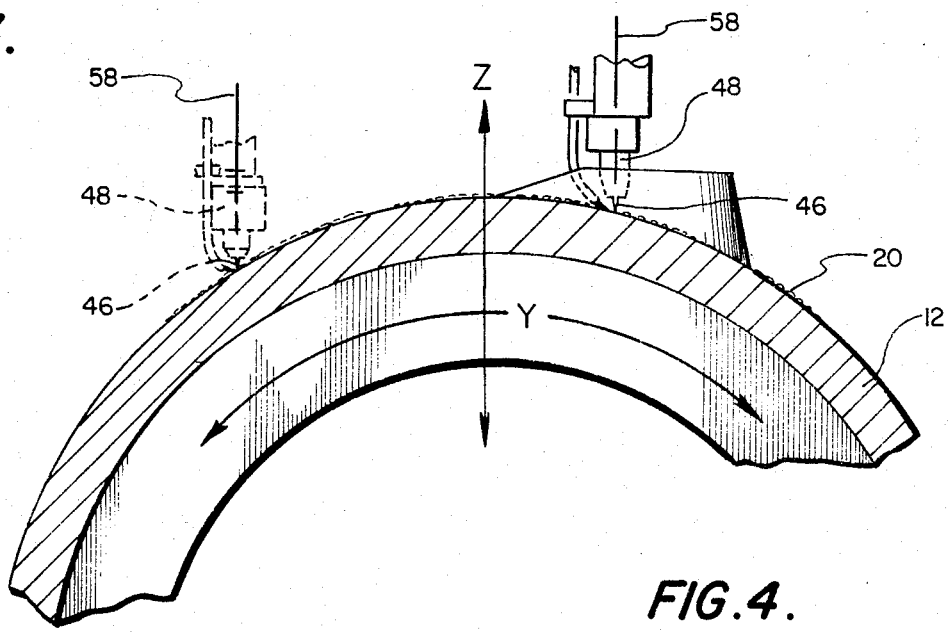
FIG. 4 is an end view illustrating the location of the welding electrode at two separate locations along the weld path.
Figure 5:
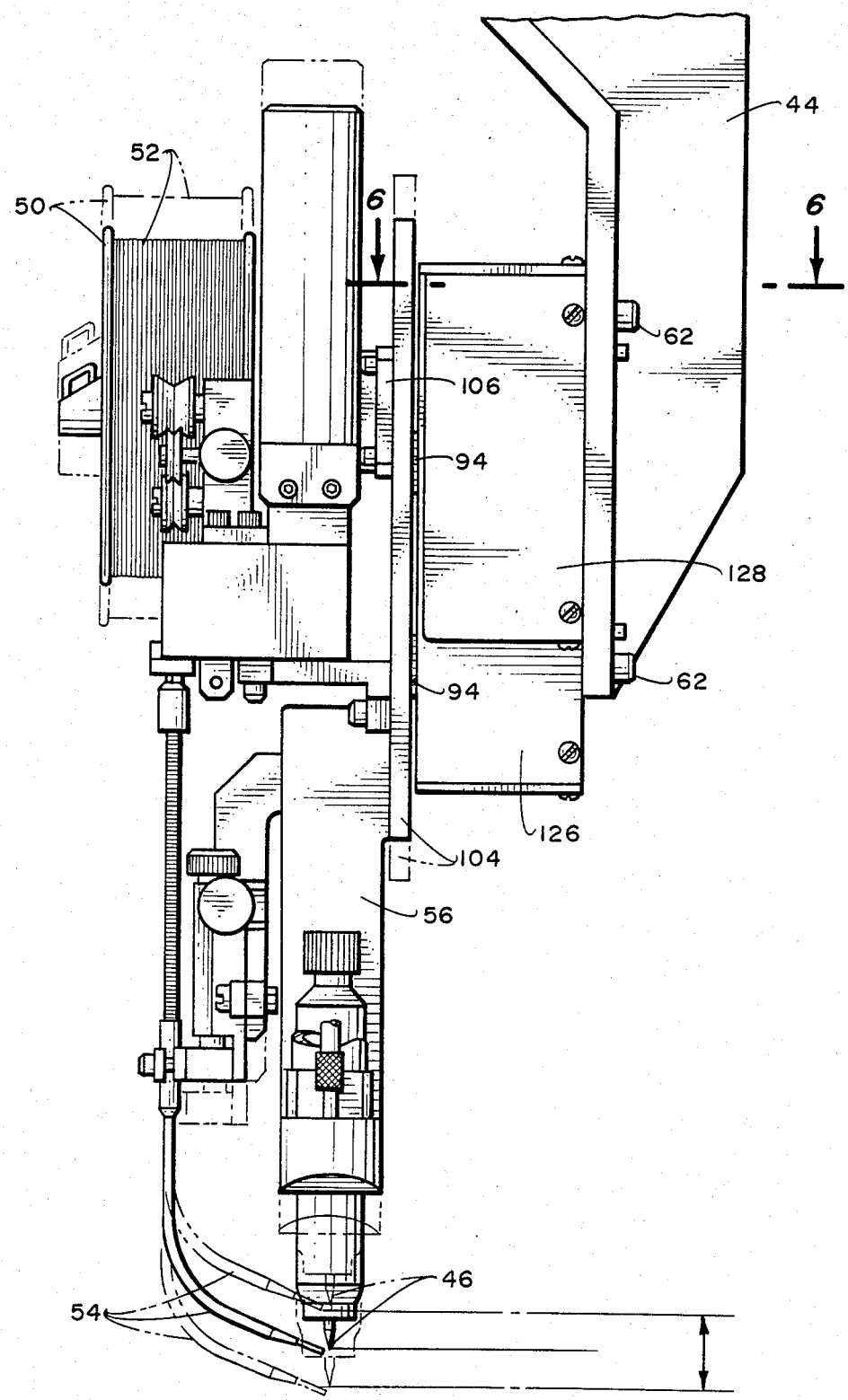
FIG. 5 is a cross-sectional view through the welding head apparatus of this invention taken along line 5—5 of FIG. 2.
Figure 8:
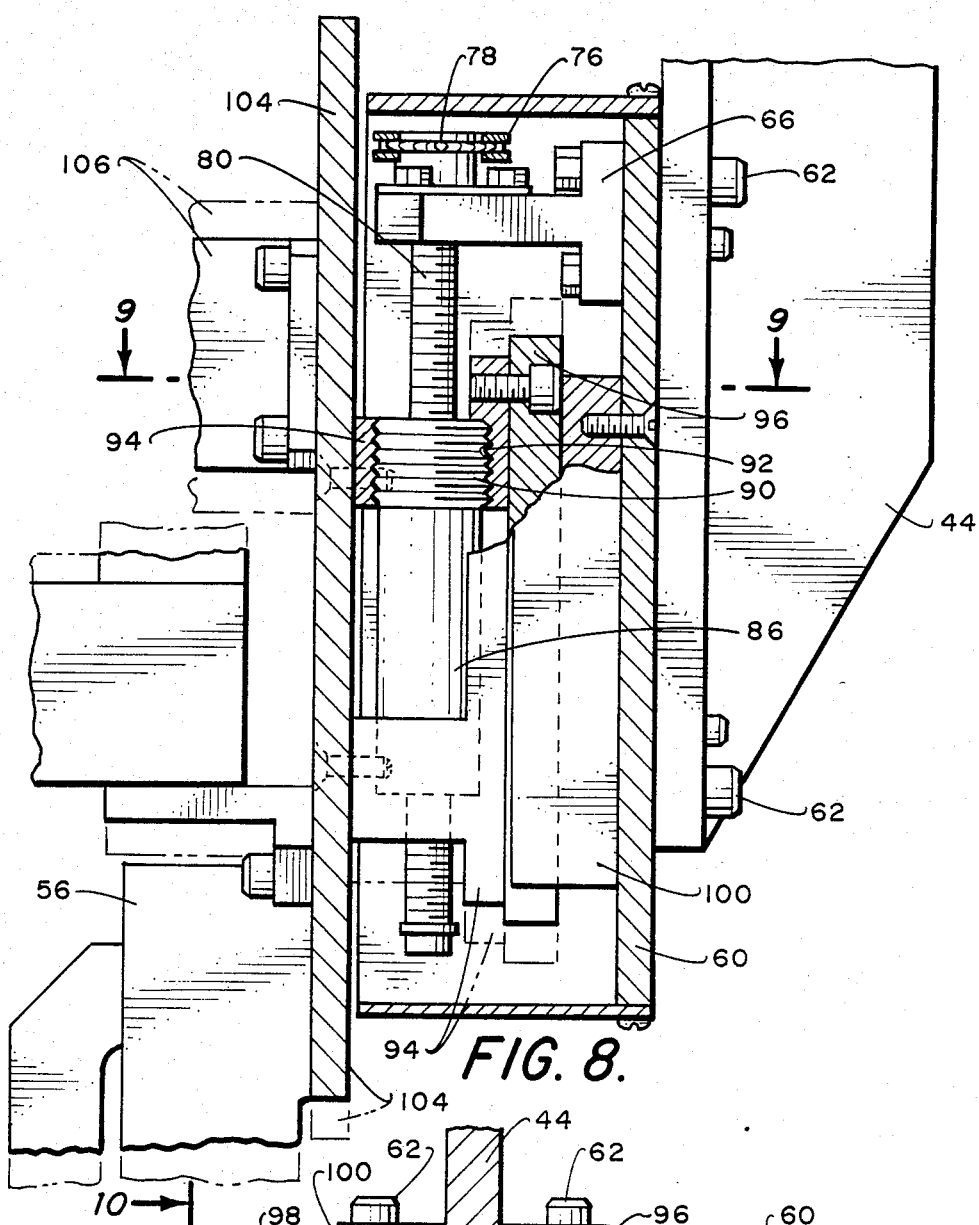
FIG. 8 is a cross-sectional view taken along line 8—8 of FIG. 7.
Figure 9:
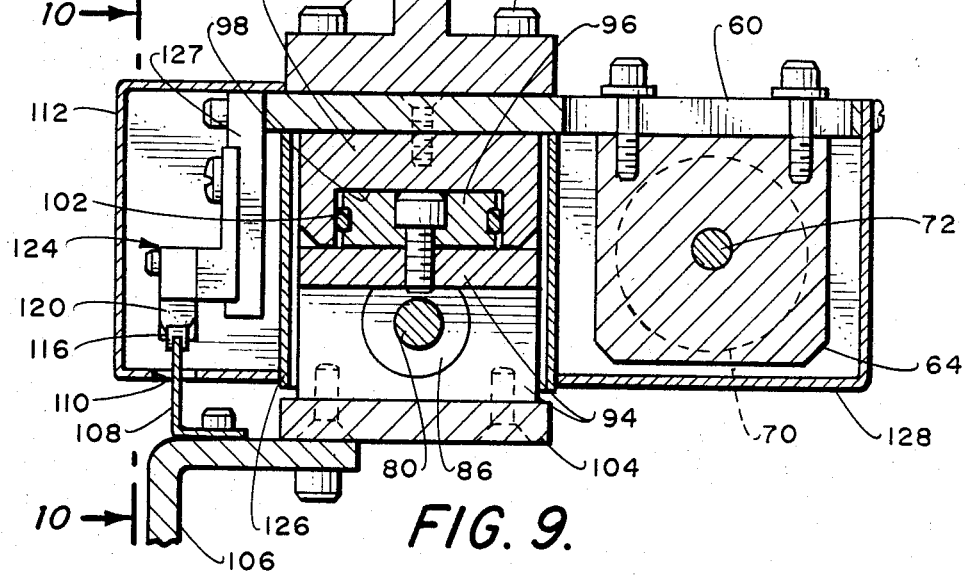
FIG. 9 is a cross-sectional view taken along line 9—9 of FIG. 8.
Figure 10:
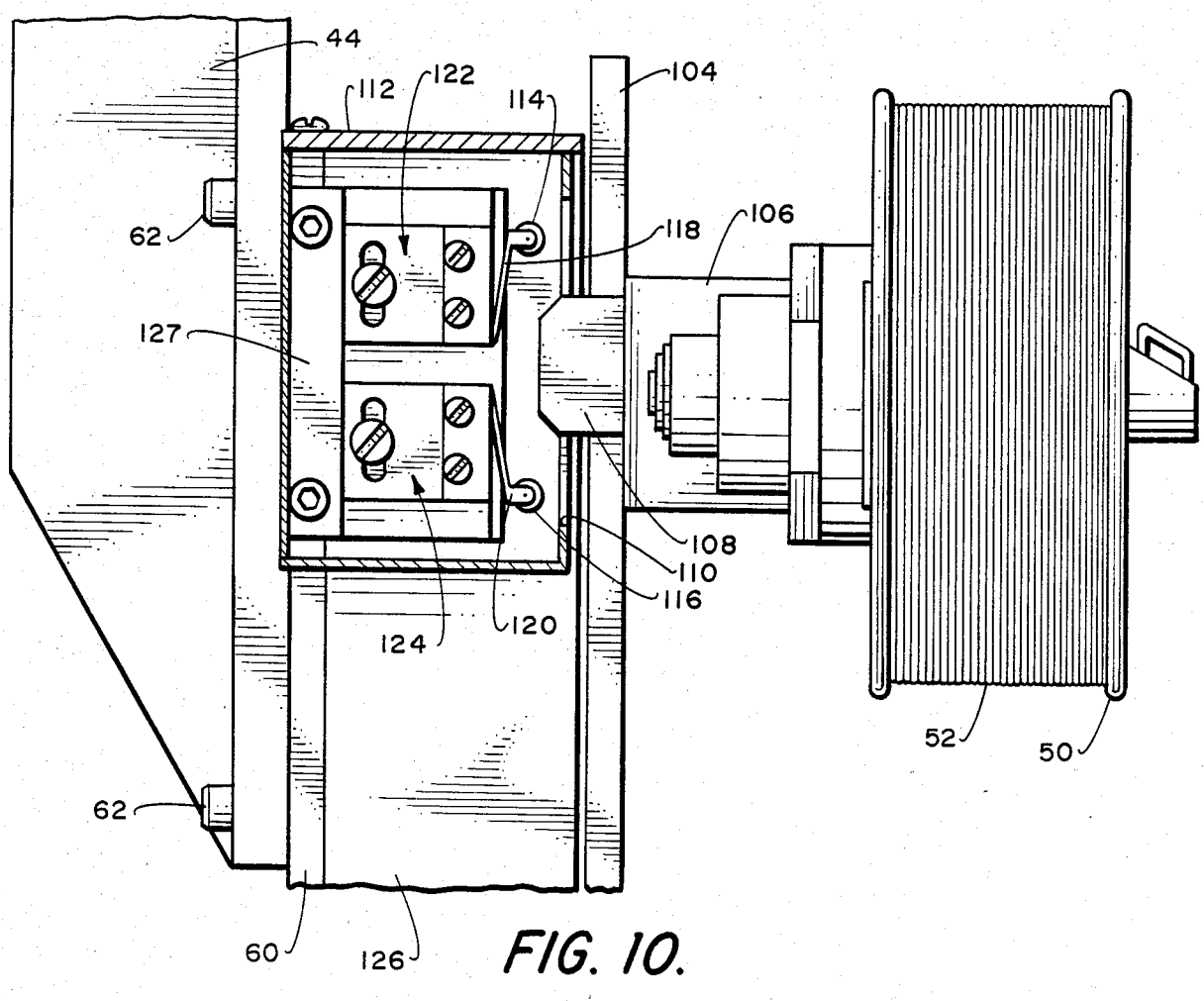
FIG. 10 is a view partly in cross-section taken along line 10—10 of FIG. 9.

Referring particularly to the drawing, there is shown a workpiece supporting table 10, a workpiece 12, a welding head apparatus 14, a housing 16 and a programmer 18. The programmer 18 is deemed to be conventional and constitutes a computer apparatus which is to be programmed according to the precise weld path 20 of the workpiece 12. Normally, it will be necessary to weld a substantial number of the workpieces 12 and each workpiece 12 will be exactly the same shape. Therefore, the X, Y and Z coordinates for each particular point along the welding path 20 will be fed into the computer 18. The computer 18 will operate through appropriate movement actuation means (not shown) to either effect movement of the welding head apparatus 14 in accordance with the X, Y and Z coordinates or similarly move the workpiece supporting table 10 with respect to the welding head 14. If the welding head 14 is being moved, the welding head 14 will move with respect to the housing 16.

The welding head apparatus 14 includes a welding head housing 22 within which is rotatably mounted a shaft 24. Fixedly mounted under the shaft 24 are a pair of gears 26 and 28. Gear 26 has a chain 30 engaged therewith, while gear 28 has a chain 32 engaged therewith. The chain 30 engages with a drive gear 34 of a first motor 36. Chain 32 engages with a drive gear 38 of a resolver 40. The operation of the motor 36 and resolver 40 will be explained further on in the specification.

The shaft 24 pivots about a first axis 42. The shaft 24 is fixedly connected to a welding electrode bracket 44. Fixedly attached to the welding electrode bracket 44 is a welding electrode 46 and its associated gas cup 48. Also, fixedly secured to the bracket 44 is a spool 50 upon which is to be wound a quantity of filler wire 52. Filler wire 52 is to be conducted through a filler wire dispensing tube 54 which is fixedly secured to the welding electrode support housing 56. The support housing 56 is also fixedly secured to the bracket 44. The tube 54 is to dispense the filler wire 52 directly adjacent the tip of the electrode 46. Actually, the free end of the filler wire 52 is to be continuously located just forward of the welding electrode 46 with respect to weld path 20. It is to be noted that the longitudinal center axis 58 of the electrode 46 coincides with the axis 42.

As previously mentioned, as the welding electrode 46 moves along the weld path 20, it is required that the free end of the filler wire 52 be located on the direction of travel of the welding electrode 46 and just forward of the tip of the welding electrode 46. This relationship must be maintained at all times even if the welding electrode makes a sudden change in direction, as in going around the corners of the workpiece 12. In order to achieve this, the bracket 44 is to be pivoted and the amount of this pivoting is to be initially programmed within the programmer 18. The programmer 18 is to signal the first motor 36 to cause pivoting of the shaft 24 at the appropriate instant, which in turn causes pivoting of the bracket 44, which in turn will result in pivoting of the filler wire about the welding electrode axis 58. The actual position, except for rotating, of the welding electrode 46 has not changed.

It has been found that because of tolerances in construction of the motor, such as the motor 36, a small error may occur in the pivoting. A typical error may be no more than two percent, but if this error occurs during each pivoting of the bracket 44, the error is compounded and the location of the free end of the filler wire 52 is no longer just forward of the tip of the welding electrode 46, but may be off five to ten or more degrees. In order to prevent this from occurring, a system of checking the position of the free end of the filler wire 52 is provided.

This system of checking takes the form of the resolver 40, which is known as a rotary position sensor. Such a sensor is deemed to be conventional and uses two ferrite tubes wound as inductors and electrically connected in series. The total electrical inductance across both of these tubes is constant. Within the sensor there is a permanent magnet assembly attached to an input shaft. As the magnet moves in relation to the position of the shaft, the inductance of one ferrite tube increases, while the inductance of the other decreases. Therefore, by comparing these two inductances, a rotational position can be precisely determined. Examples of such position sensors are disclosed within U.S. Pat. Nos. 3,988,710, 4,088,977 and 4,137,512.

The position determined by the resolver 40 is to be read by the programmer 18 and, if the position read by the resolver 40 agrees with the preprogrammed position value of the programmer, then no pivoting of the shaft 24 occurs. However, if the position determined by the resolver 40 is different, then the resolver 40 will automatically be directed by the programmer 18 to be activated accordingly and cause rotation of the shaft 24 to pivot the bracket 44 and also the filler wire 52 to the desired position.

Inherently, in the welding of any structure, there are slight variations in weld shape, structure, contours, weld thickness and weld edge preparation. It is not possible to preprogram with the exactness that is required to follow the weld contour where there are introduced these slight variations. These slight variations are going to occur from one welded part to another welded part even though allegedly the welded parts are identical.

Figure 11:
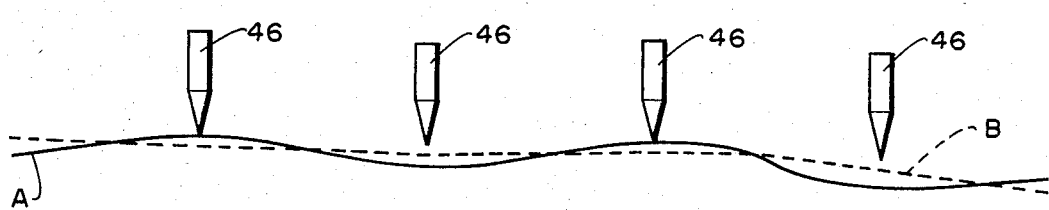
FIG. 11 is a diagrammatic view depicting the difference in the position of the tip of the welding electrode when compared to a preprogrammed weld path and the actual weld path.

Referring particularly to FIG. 11, there is generally depicted, though exaggerated for illustrative purposes, a typical difference between one weld path and another weld path. The welding electrode is shown at 46. The solid line A is to represent the preprogrammed weld path. The dotted line B represents the actual weld path for the particular part that is being welded. If the welding electrode 46 were to follow the path A, it can be seen that the electrode will at times be too close to the actual weld path or at times will be too far away from the actual weld path.

Weld quality is directly a relationship of the distance of the electrode from the weld path. Minute changes in this physical spacing can significantly alter weld quality. Arc voltage is in direct proportion the the spacing of the electrode from the weld path. A particular voltage (reference voltage) is preselected for the specific weld environment. This reference voltage is aquirable from reference books. If the arc voltage is held equal to this reference voltage, then optimum welding conditions will be met.

To compensate for and oversome the slight variations which will inherently occur between a preprogrammed weld path and an actual weld path, an automatic voltage control system is utilized. This automatic control system includes automatic voltage control (AVC) circuitry which is shown as numeral 19 in FIG. 1 of the drawings. This automatic voltage control circuitry, which is shown in more detail in FIG. 12, monitors the arc voltage at the tip of the welding electrode 46 during welding. If the monitored voltage is different from the reference voltage, the AVC circuitry 19 activates a mechanism (to be described) to appropriately change the spacing of the welding electrode 46 with respect to the workpiece 12. This mechanism is capable of moving the electrode 46 within a limited range along the Z-axis. This limited range could be any reasonable number, such as three to six centimeters.

The mechanism to achieve this fine adjustment of the welding electrode 46 is shown in detail in FIGS. 5–12 of the drawings. Fixedly attached to the welding electrode bracket 44 is a mounting plate 60. Plate 60 will normally be secured by conventional bolt fastener 62 to the welding electrode bracket 44. Fixedly secured to the mounting plate 60 is a first support plate 64 and a second support plate 66. The support plate 64 includes an enlarged opening (not shown). Fixedly secured by fasteners 68 to the first support plate 64 is a motor 70. The motor housing 70 is to be electrically operated from the AVC circuitry 19 to rotate motor shaft 72. The motor shaft 72 is capable of being rotated in a clockwise or counter clockwise direction. The motor shaft 72 is attached to a toothed drive pulley 74. Drive pulley 74 connects with a chain 76. The chain 76 connects with a driven pulley 78. Driven pulley 78 is fixedly secured onto one end of a lead screw 80. The lead screw 80 extends through opening 82 formed within the second support plate 66. Mounted within the wall of the opening 82 is a bearing assembly 84 which rotatably supports one end of the lead screw 80. The lead screw 80 is longitudinally fixed in position with respect to the second support plate 66, but is capable of rotational movement in respect thereto.

Intermediate the ends of the lead screw 80 there is located a sleeve 86. The lead screw 80 is threadably secured within a threaded opening 88 formed within the sleeve 86. One end of the sleeve 86 includes a series of exterior threads 90. The threaded section 90 engages with threaded opening 92 formed within a supporting member 94. The supporting member 94 is in turn fixedly mounted onto a slide plate 96. The slide plate 96 is slidably mounted within channel 98 formed within fixed plate 100. The fixed plate 100 is fixedly secured onto the mounting plate 60. It is to be understood that the slide plate 96 is capable of longitudinal movement within the channel 98. Appropriate lineal bearing assembly 102 is located between the slide plate 96 and the fixed plate 100.

Fixedly mounted on the member 94 is an exterior plate 104. The welding electrode support housing 56 is fixedly mounted onto the exterior plate 104. The spool 50 is mounted onto a bracket 106 which is also fixedly mounted onto the exterior plate 104. It is to thus be seen from the foregoing that the spool 50, as well as the filler wire dispensing tube 54, the welding electrode 48 and the electrode support housing 56 are all mounted on the exterior plate 104. The exterior plate 104 is capable of longitudinal movement relative to the welding electrode supporting bracket 44. It is this longitudinal movement which varies the spacing of the welding electrode 46 relative to the workpiece 12 through the monitoring of the welding voltage.

Figure 12:
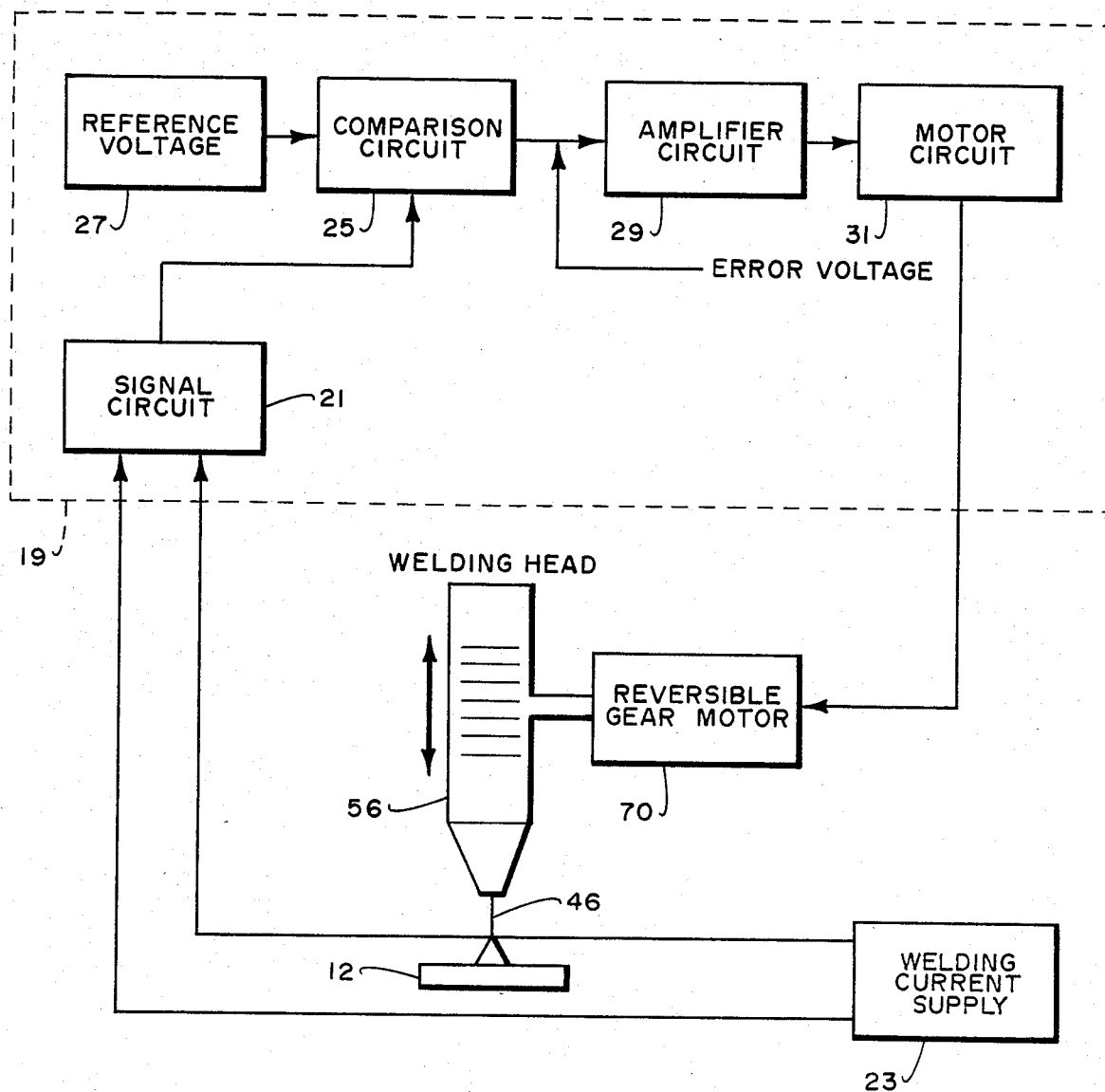
FIG. 12 is a block diagram of the automatic voltage control circuitry which is utilized to accurately position the tip of the welding electrode in respect to the workpiece.

Referring particularly to FIG. 12, the AVC circuitry 19 includes a signal circuit 21 which receives input from the welding current supply 23. The signal circuit is transmitted to a comparison circuit 25. The comparison circuit 25 receives the reference voltage 27 which is then compared with the actual voltage across the arc which has been transmitted to the signal circuit 21. If there is a difference, which is denoted as error voltage, that difference is transmitted to an amplifier circuit 29 and then to a motor circuit 31. The motor circuit 31 operates the motor 70, either clockwise or counterclockwise. Of course, as previously mentioned, the motor 70 then causes movement of the welding electrode support housing 56 toward and away from the workpiece 12. It is to be noted that this movement is composed of a mass of short continuous up and down movements. Generally, it can be said that the electrode 46 is constantly "hunting" for the exact position.

The extent of this movement is limited although it is extremely unlikely that the moving of the welding electrode 26 will ever reach either extremity of the limited movement. It is to be kept in mind that the movement of the welding electrode 46 has been preprogrammed into the programmer 18 for the particular weld path 20. The variations from this movement would normally, at most, involve a few tenths of a centimeter. However, if for some reason, it ever reaches one of the extremities, there is included an automatic shut-off to prevent further movement.

This automatic shut off includes the use of bracket 108 which is fixedly secured to the arm 106. The bracket 108 extends through slot 110 formed within a cover 112. The cover 112 is fixedly mounted onto plate 60. At one extremity of movement, the plate 108 is capable of contacting cam wheel 114 and that at the other extremity of movement, the plate 108 is capable of contacting the cam wheel 116. The cam wheel 114 is mounted onto spring member 118 and the cam wheel 116 is mounted onto spring member 120. The spring member 118 is connected to an electrical switch assembly 122. The spring member 120 is connected to an electrical switch assembly 124. The switch assemblies 122 and 124 are basically identical to each other, but are merely located in a mirror image relationship in respect to each other. Each of the switch assemblies 122 and 124 are fixedly mounted onto base plate 127. The base plate 127 is in turn fixedly mounted onto the supporting plate 60.

The bracket 108 reaches the upper extremity of movement and contacts the movement 114. The spring member 118 deflects inwardly which turns the switch assembly 122 to the off position. This, in turn, deactivates the motor within the motor 70 and prevents the motor from being driven in the rotational direction which produces the lineal movement in the direction of the roller 114. However, the motor is still capable of being rotated in the opposite direction which, in turn, would move the bracket 108 toward the roller 116.

However, it is to be understood that if the bracket 108 then contacts roller 116, the switch assembly 124 will deactivate the motor to prevent further movement in this direction.

It is to be understood that appropriate cover plates 126 and 128 will be mounted between the plate 60 and 104 to protect the movable parts comprising the slide plate 96 and the motor shaft 72 from contamination by foreign material, such as dirt.

What is claimed is:

1. A welding apparatus for producing a weld along a weld path within a workpiece, said apparatus comprising:

a welding electrode mounted on a welding electrode bracket;

means for producing relative movement between said welding electrode and said workpiece, said relative movement comprising a plurality of separate axes forming an x-axis and a y-axis and a z-axis, said axes being perpendicular to each other, said z-axis being in a direction toward and away from said workpiece;

a filler wire assembly fixed relative to said welding electrode, said filler wire assembly having an outer free end located directly adjacent to said welding electrode;

a housing, said welding electrode bracket being rotatably mounted upon said housing about a first axis, said welding electrode being located on said first axis, the rotation of said welding electrode bracket being controlled by a predetermined program, said welding electrode bracket to rotate to continuously maintain said outer free end of said filler wire assembly at a precise position relative to said welding electrode, with said precise position being just forward of said welding electrode as such moves along said weld path, said first axis coinciding with said z-axis; and said welding electrode being movable along a lineal path relative to said welding electrode bracket, said lineal path coinciding with said z-axis, said movement along said lineal path being controlled by a control means, said control means maintaining the arc voltage constant by physically controlling the spacing of said welding electrode from said workpiece.

2. A welding apparatus as defined in claim 1 wherein said control means includes:

a slide plate attached to said welding electrode; and a fixed plate being fixedly attached to said welding electrode bracket, said fixed plate including a channel, said slide plate being slidably mounted within said channel.

3. The welding apparatus as defined in claim 1 including:

a resolver rotatably connected to said welding electrode bracket, said resolver to operate through a feedback assembly to varify the rotated position of said welding electrode bracket, if the exact predetermined position is not obtained by said first motor said resolver gives a command to rotate said welding electrode bracket to the exact predetermined position.

4. The welding apparatus as defined in claim 2 including:

a resolver rotatably connected to said welding electrode bracket, said resolver to operate through a feedback assembly to varify the rotated position of said welding electrode bracket, if the exact predetermined position.

* * * * *